(12) United States Patent
Kim et al.

(10) Patent No.: US 6,563,994 B1
(45) Date of Patent: May 13, 2003

(54) OBJECT WITH RADIALLY-VARYING PROPERTIES AND APPARATUS AND METHOD OF PREPARING THE SAME

(75) Inventors: In Bae Kim, Seoul (KR); Jin Taek Hwang, Daejeon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/701,025

(22) PCT Filed: Mar. 23, 2000

(86) PCT No.: PCT/KR00/00252

§ 371 (c)(1),
(2), (4) Date: Jan. 26, 2001

(87) PCT Pub. No.: WO00/56777

PCT Pub. Date: Sep. 28, 2000

(30) Foreign Application Priority Data

Mar. 24, 1999 (KR) .............................................. 99-9976
Feb. 25, 2000 (KR) .......................................... 2000-9290

(51) Int. Cl.[7] .......................... G02B 6/18; C03B 37/023
(52) U.S. Cl. ........................ 385/124; 264/1.24; 65/385; 65/178; 523/313
(58) Field of Search ................................. 385/123, 124; 65/385, 121, 135.2, 135.3, 178, 302, 376; 264/1.1, 1.24, 2.1; 366/241, 279, 348; 523/313

(56) References Cited

U.S. PATENT DOCUMENTS

| | | | | |
|---|---|---|---|---|
| 4,022,855 A | * | 5/1977 | Hamblen | 264/1.38 |
| 4,655,605 A | * | 4/1987 | Cipelletti | 366/312 |
| 4,875,917 A | * | 10/1989 | Lentz | 264/1.7 |
| 5,059,375 A | * | 10/1991 | Lindsay | 264/167 |
| D323,513 S | * | 1/1992 | Van Asten | D15/82 |
| 5,253,323 A | * | 10/1993 | Koike et al. | 385/143 |
| 5,363,746 A | * | 11/1994 | Gordon | 99/328 |
| 5,382,448 A | * | 1/1995 | Koike et al. | 427/163.2 |
| 5,593,621 A | * | 1/1997 | Koike et al. | 264/1.29 |
| 6,267,915 B1 | * | 7/2001 | Park et al. | 264/1.24 |
| 2002/0031318 A1 | * | 3/2002 | Choi et al. | 385/124 |

* cited by examiner

Primary Examiner—Brian Healy
Assistant Examiner—Sarah U Song
(74) Attorney, Agent, or Firm—Lee & Sterba, P.C.

(57) ABSTRACT

A method of preparing an object with a radially-varying property is disclosed which includes the steps of providing a preform reactor including an outer container having a bottom, an inner container installed in the outer container, the inner container having a bottom, a rotating rod installed at a position in the outer container, and a sealing member for sealing the outer and inner containers at the bottoms thereof; filling the inner container with an inner material and a space between the inner container and the outer container with an outer material wherein the outer material has a different property from the inner material; removing the inner container; and rotating the rotating rod for laminar mixing of the inner and outer materials. An apparatus for carrying out the inventive method, and objects formed in accordance with the inventive method, are also disclosed.

21 Claims, 7 Drawing Sheets

OBJECT WITH RADIALLY-VARYING PROPERTIES AND APPARATUS AND METHOD OF PREPARING THE SAME

FIELD OF THE INVENTION

The present invention relates to an object with radially-varying properties, which is used to prepare graded-index plastic optical fiber in the field of communication or image transmission. More particularly, the present invention relates to a method of preparing an object with radially-varying properties and an apparatus for preparing the same. The object with radially-varying properties can be prepared with polymers or ceramics. In this invention, the properties mean an optical property such as refractive index, tensile strength, color, heat expansion coefficient, relative concentration of components, effect of catalyst, etc.

BACKGROUND OF THE INVENTION

An object with radially-varying properties can be used in the field of communication or image transmission or for other purposes. In particular, an object with radially-varying properties has been used as graded-index plastic optical fiber for telecommunication.

The conventional optical fibers for communication systems are classified into single-mode glass optical fibers and multi-mode glass optical fibers. The single-mode glass optical fibers have been widely used as long-distance and high-speed communication media. However, because the single-mode glass optical fibers have small core diameters, typically 5 to 10 microns, extreme accuracy is required in the alignment of the fibers for interconnection with other components of the optical communication system, thereby increasing the costs of the whole system. In contrast to single-mode glass fibers, multi-mode glass fibers, which can have diameters larger than single-mode glass fibers, have been used primarily for short distance transmission such as local area networks (LANs). However, even their moderate cost for interconnections has limited their application. Consequently, metallic cables such as twisted pair or coaxial cable are still used extensively in short range applications, namely up to 200 meters. However, these metallic cables cannot meet the anticipated future bandwidth requirement of several hundred MHz (for example, the asynchronous transfer mode[ATM] standard of 625 megabits per second). There has been considerable interest in developing plastic optical fiber (POF) in the short range communication applications, such as LANs. POF can have core diameters of about 0.5 to 1.0 mm, which makes it possible to adopt injection-molded polymer connectors, drastically reducing the cost associated with interconnecting the POF to the other components of a system. These plastic optical fibers can have a step-index (SI) structure or gradient-index (GI) structure. Unfortunately, step-index plastic optical fiber (SI-POF) suffers high modal dispersion and therefore cannot meet the bandwidth requirements. However, gradient-index plastic optical fibers (GRIN-POF), having low modal dispersion, have high potential to be a high bandwidth, cost effective media for use in short range communication applications.

An interfacial gel polymerization process for preparing GRIN-POF was introduced by professor Koike in 1988 (Koike, Y. et al., Applied Optics, vol. 27, 486(1988)), and thereafter many patent applications were filed: U.S. Pat. No. 5,253,323 to Nippon Petrochemicals Co.; U.S. Pat. No. 5,382,448 to Nippon Petrochemicals Co.; U.S. Pat. No. 5,593,621 to Yasuhiro Koike and Ryo Nihei; International Patent PCT WO 92/03750 G02B6/00 to Nippon Petrochemical Co.; International Patent PCT WO 92/03751 G02B6/00; Japan Kokai Tokyo Koho JP 03-78706 G02B6/00 to Mitsubishi Rayon; Japan Kokai Tokyo Koho JP 04-86603 G02B6/00 to Toray Ind., etc. These processes may be divided into two broad types:

1. Batch processes in which a preform is made with a gradient index and subsequently drawn into a fiber. The preform is made of a polymer(s) plus a low molecular weight additive.
2. Fiber extrusion processes followed by radial extraction of low molecular weight components, and/or radial infusion of molecular weight components, and subsequent polymerization of residual monomer.

The first type of process was successfully implemented in producing fiber with the measured bandwidth of 2.5 Gbits/second. The second type of process has had similar success in achieving a high bandwidth.

In addition to the above-mentioned patents and patent applications, U.S. patent application Ser. No. 89/929,161 (PCT/US97/16172) now U.S. Pat. No. 6,267,915 on a method of preparing GI optical fiber was filed by Park and Walker. The process by Park et al. is achieved by applying a polymeric material having an axial variation of a material property to a rotating cone, which converts the axial variation to the radial variation. Park et al. also disclose an apparatus for producing a cylindrical form with at least one radially-varying material property comprising mechanical means for transforming an axial variation of a material property into a radial properly of the material property.

With respect to using GRIN-POF in LANs and other related applications, the objective is to minimize modal dispersion. The required radial refractive index profile for minimal modal dispersion has been studied extensively. The model (Halley,P. [1987] Fiber Optic Systems, J. Wiley and Sons; Olshansky,R., D. B. Keck [976] Appl.Opt.15(2): 483–491) of a GRIN fiber normally considered is that of a "power law" index variation:

$$n(r) = n_1 \left[1 - 2\Delta\left(\frac{r}{a}\right)^g\right]^{\frac{1}{2}} \quad \text{for } r \leq a$$
$$n_2 \quad \text{for } r > a$$

where r is the radial distance from the fiber axis, a is the radius of the fiber, $n_1$ and $n_2$ are the refractive indices at r=0 and r=a, respectively, where $n_1 \square n_2$. The parameter g determines the index profile as a function of radius and $2\square=(n_1^2-n_2^2)/n_1^2$. In the particular case where g=2, the power law is called the "parabolic law". When the value of g approaches to 2, an optimum refractive index profile for maximum bandwidth can be obtained. It can be shown that if a light signal in the form of a delta function is launched into a GRIN fiber, the maximum bandwidth, B is given by:

$$B = \frac{c}{0.088Ln_1} \cdot \frac{1}{\Delta^2} \text{ (bits/second)}$$

where L is the length of the fiber, and c is the speed of light.

In theory, the bandwidth of GRIN-POF is extremely sensitive to the value of g near the optimum value. Therefore, in preparing GRIN-POF, how large a bandwidth GRIN-POF has depends on the ability of a process to control the value of g. In conventional processes of preparing GRIN-POF, except the process by Park et al., the refractive index profile in the radial direction is determined by the diffusion of a lower molecular material or the relative reactivity of two materials. Thus the conventional processes do not have the ability to control the value of g or the radial profile of the refractive index. The process by Park et al. above-mentioned claims to have the ability to control the value of g by mechanical mixing of two or more polymers using a particular extrusion mold die. However, the process has disadvantages in that it is difficult to produce optical fiber with a low attenuation due to the complicated structure of the extrusion die and contaminants resulting from the thermal decomposition of polymers from coextrusion process.

Therefore, the present inventors have developed a method of preparing a plastic optical fiber and an apparatus for preparing the same. The process of this invention has the ability to control the refractive index profile. Unlike the process of Park et al., the new process is not an extrusion process and the apparatus is not complicated. The present process can provide a method of preparing a plastic optical fiber with a low intensity loss of a light signal as in the process by Koike.

A feature of the present invention is the provision of an object with radially-varying properties, which is used to prepare graded-index plastic optical fiber in the field of communication or image transmission.

Another feature of the present invention is the provision of a method of preparing an object with radially-varying properties, which is used to prepare graded-index plastic optical fiber in the field of communication or image transmission.

A further feature of the present invention is the provision of a method of preparing an object with radially-varying properties, which has the ability to control the value of g or radial index of refraction.

A further feature of the present invention is the provision of an apparatus for preparing an object with radially-varying properties, which has a simple structure.

A further feature of the present invention is the provision of a method of preparing a plastic optical fiber with a low intensity loss of a light signal.

Other features and advantages of this invention will be apparent from the ensuing disclosure and appended claims.

SUMMARY OF THE INVENTION

The method of preparing an object with radially-varying properties in accordance with the present invention, which is used to prepare graded-index plastic optical fiber in the field of communication or image transmission, comprises providing a reaction apparatus comprising an outer container, an inner container installed in the outer container, a rotating rod installed at a position in the inner container, and a sealing member for sealing the outer and inner containers at the bottoms thereof; filling the inner container with an inner material and a space between the inner container and the outer container with an outer material wherein the outer material has different properties from the inner material; removing the inner container; and rotating the rotating rod for laminar mixing of the two materials. The apparatus for preparing an object with radially-varying properties in accordance with the present invention comprises an outer container with a certain cross-section; an inner container with a certain cross-section, installed in the outer container; a rotating rod installed at a position in the inner container, and a sealing member for sealing the outer and inner containers at the bottoms thereof.

DETAILED DESCRIPTION OF THE PREFERRED EMBODIMENTS

The object with radially-varying properties in accordance with the present invention, which is used to prepare graded-index plastic optical fiber in the field of communication or image transmission, can be prepared by a method comprising providing a reaction apparatus comprising an outer container, an inner container installed in the outer container, a rotating rod installed at a position in the inner container, and a sealing member for sealing the outer and inner containers at the bottoms thereof; filling the inner container with an inner material and the space between between the inner container and the outer container with an outer material wherein the outer material has different properties from the inner material; removing the inner container; and rotating the rotating rod for laminar mixing of the two materials.

The apparatus for preparing an object with radially-varying properties in accordance with the present invention comprises an outer container 1 with a certain cross-section; an inner container 2 with a certain cross-section, installed in the outer container; a rotating rod 3 installed at a position in the inner container, and a sealing member 4 for sealing the outer and inner containers at the bottoms thereof. In general, the outer container has a cross-section of a circular type, however, the cross section can be a triangular type, a rectangular type, or other geometrical shape depending on the profile of properties of an object. The present invention shall be described in detail with reference to the accompanying drawings.

Figure 1A:
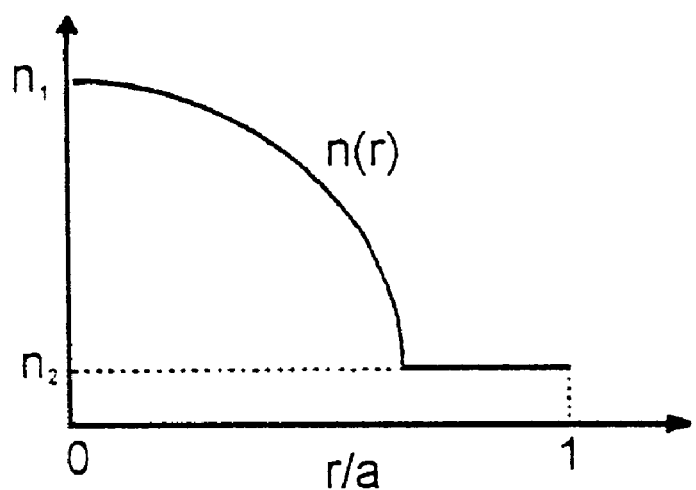
FIG. 1a is a profile of a radially varying property and FIG. 1b is a schematic view of an object with radially-varying properties.
Figure 1B:
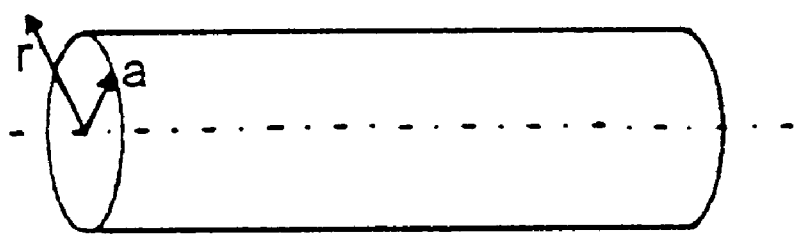
Figure 2:
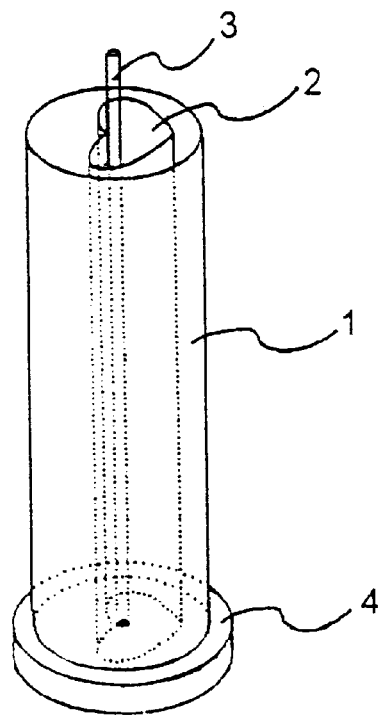
FIG. 2 is a schematic view of an apparatus for preparing an object with radially-varying properties according to the present invention.
Figure 3:
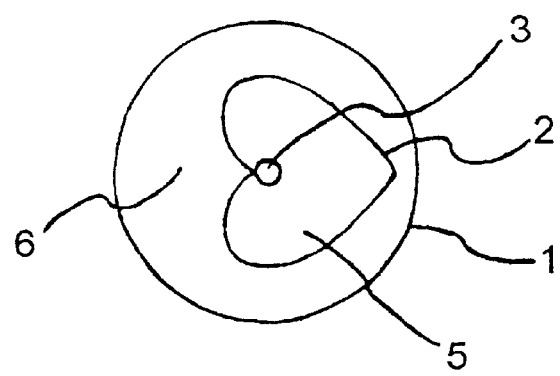
FIG. 3 is a cross-sectional view of the apparatus of FIG. 2.
Figure 4:
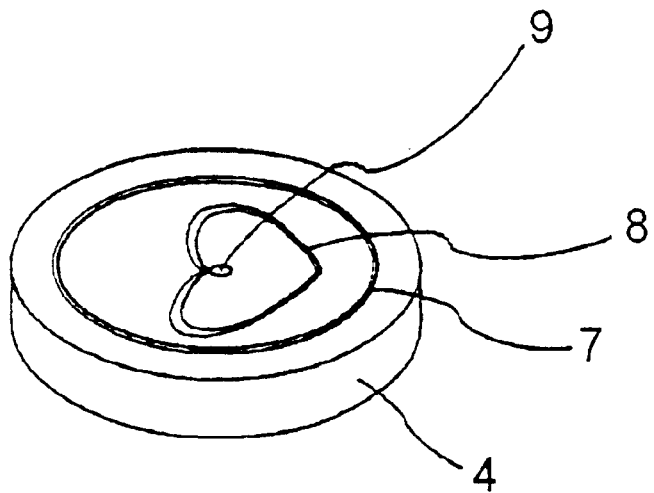
FIG. 4 is a schematic view of the sealing member of the apparatus of FIG. 2 at the bottom.

FIG. 1a is a profile of a radially varying property and FIG. 1b is a schematic view of an object with radially-varying properties. FIG. 2 is a schematic view of an apparatus for preparing an object with radially-varying properties according to the present invention. FIG. 3 is a cross-sectional view of the apparatus of FIG. 2. FIG. 4 is a schematic view of the sealing member of the apparatus of FIG. 2 for sealing the outer and inner containers at the bottoms.

Figure 5:
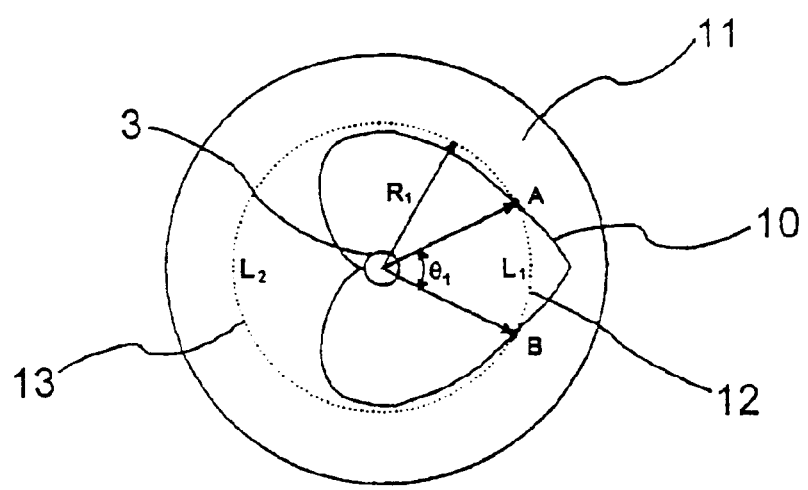
FIG. 5 is a cross-sectional view of an apparatus according to the present invention, showing the mixing ratio of inner material to outer material in which the cross-section of the inner container is a heart shape.
Figure 6A:
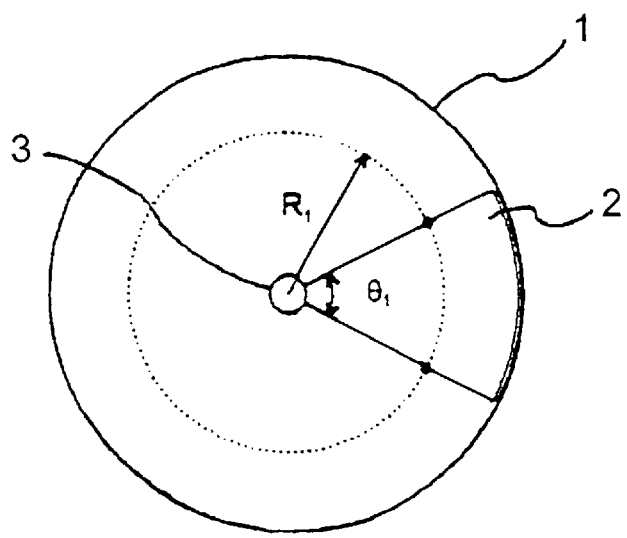
FIG. 6a is a cross-sectional view of an apparatus according to the present invention, showing the mixing ratio of inner material to outer material in which the cross-section of the inner container is a pie-like shape.
Figure 6B:
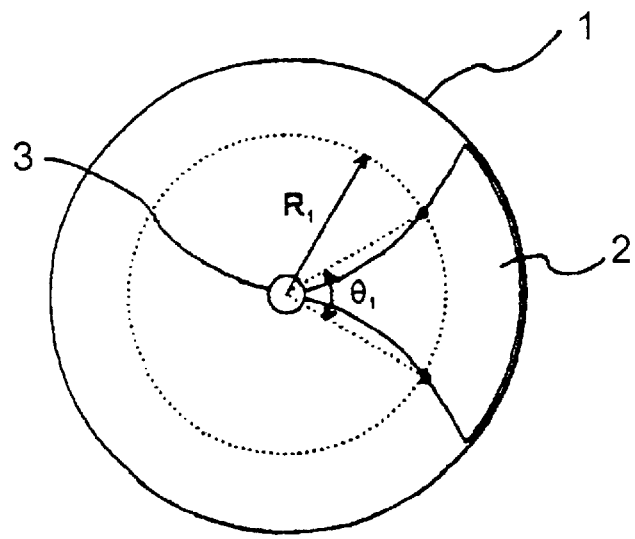
FIG. 6b is a cross-sectional view of an apparatus according to the present invention, showing the mixing ratio of inner material to outer material in which the cross-section of the inner container is a trumpet-like shape.
Figure 7A:
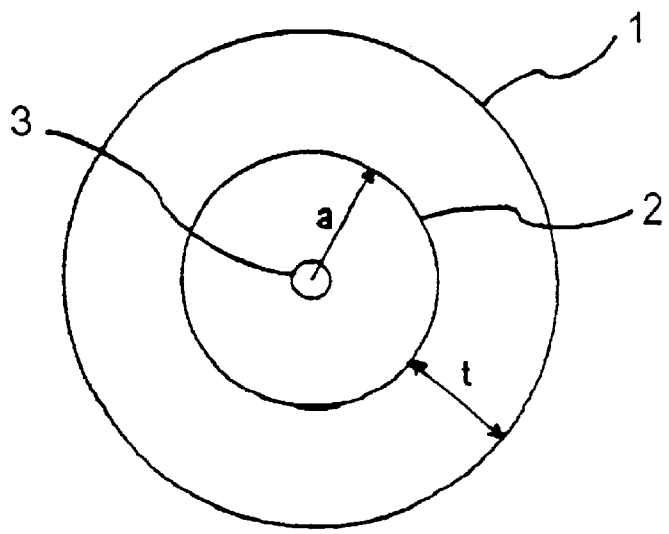
FIG. 7a is a cross-sectional view of an the apparatus according to the present invention where the cross-sections of the inner and outer containers are circular type and the circles are concentric.
Figure 7B:
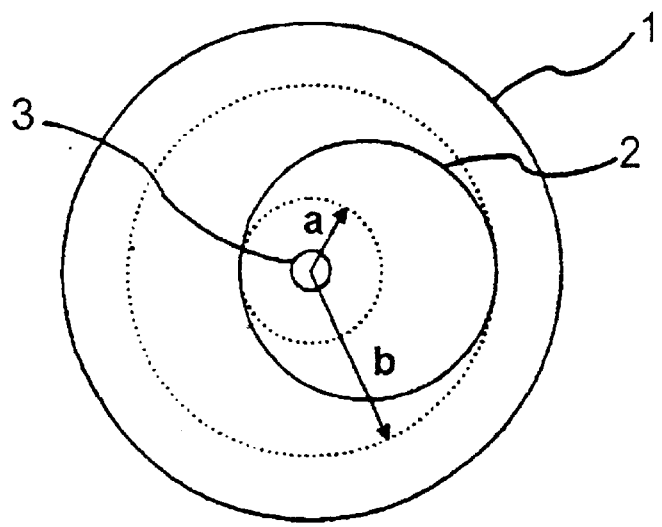
FIG. 7b is a cross-sectional view of an apparatus according to the present invention where the cross-sections of the inner and outer containers are circular type and the circles are eccentric.

FIG. 5 is a cross-sectional view of an apparatus according to the present invention, showing the mixing ratio of inner material to outer material in which the cross-section of the inner container is a heart shape. FIG. 6a is a cross-sectional view of the apparatus according to an present invention, showing the mixing ratio of inner material to outer material in which the cross-section of the inner container is a pie-like shape, and FIG. 6b is a cross-sectional view of an apparatus according to the present invention, showing the mixing ratio of inner material to outer material in which the cross-section of the inner container is a trumpet-like shape. FIG. 7a is a cross-sectional view of an apparatus according to the present invention where the cross-sections of the inner and outer containers are circular type and the circles are concentric, and FIG. 7b is a cross-sectional view of an apparatus according to the present invention where the cross-sections of the inner and outer containers are circular type and the circles are eccentric.

Figure 8A:
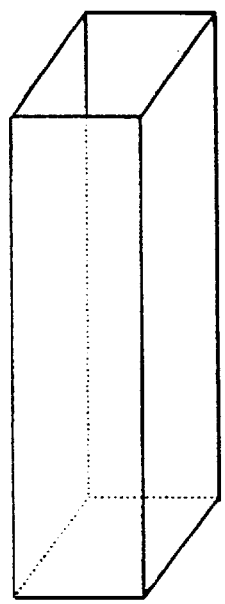
FIG. 8a is a schematic view of an outer container having a cross-section of a rectangular type.
Figure 8B:
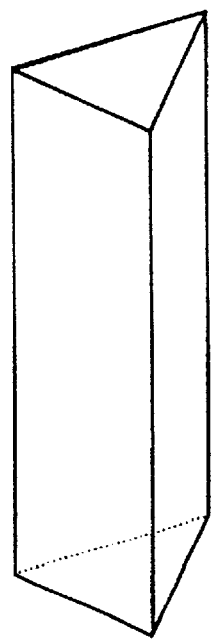
FIG. 8b is a schematic view of an outer container having a cross-section of a triangular type.
Figure 9A:
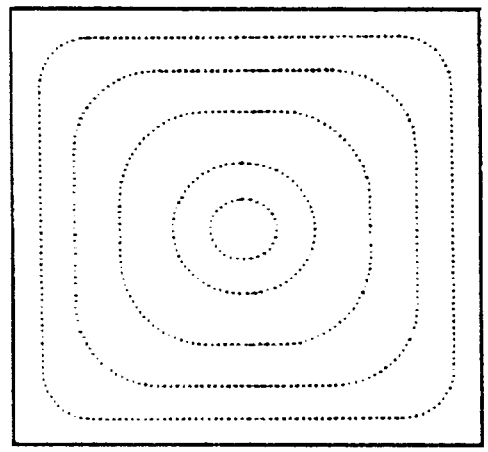
FIG. 9a is a cross-sectional view of an object with radially-varying properties according to the present invention, showing the contours with the same properties when the outer container is a rectangular type.
Figure 9B:
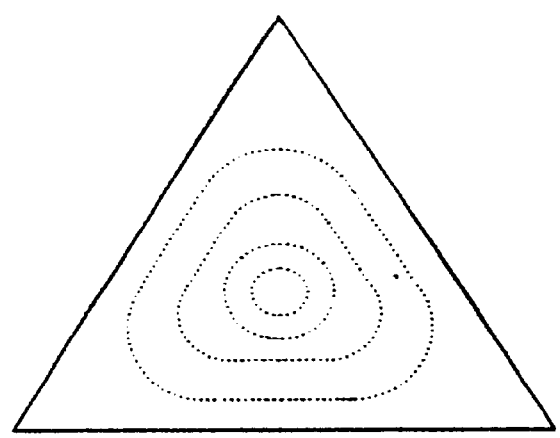
FIG. 9b is a cross-sectional view of an object with radially-varying properties according to the present invention, showing the contours with the same properties when the outer container is a triangular type.

FIG. 8a is a schematic view of an outer container having a cross-section of a rectangular type, and FIG. 8b is a schematic view of an outer container having a cross-section of a triangular type. FIG. 9a is a cross-sectional view of an object with radially-varying properties according to the present invention, showing the contours with the same properties when the outer container is a rectangular type, and FIG. 9b is a cross-sectional view of an object with radially-varying properties according to the present invention, showing the contours with the same properties when the outer container is a triangular type.

As shown in FIGS. 2 and 4, the outer container 1, inner container 2 and rotating rod 3 are assembled into the grooves 7, 8 and 9 on the sealing member 4, respectively. The outer container 1, inner container 2 and rotating rod 3 should be vertically parallel. The rotating rod can be assembled at a position between the inner container and the outer container. The outer container and inner container should be sealed with the sealing member. An inner material is filled in the inner container and an outer material is filled in the space between the inner container and the outer container, wherein the inner material has a high index of refraction and the outer material has a low index of refraction. The apparatus can include a stirring means to agitate the inner material and a stirring means to agitate the outer material. Further, the apparatus can include a heating means to heat the inner and outer materials. The apparatus can have a second inner container or more in the outer container. The outer container has a diameter of about 15 cm and the rotating rod has a diameter of from 5 mm to 5 cm and an rpm of from 5 to 30. The outer container, inner container and rotating rod are made of a material selected from the group consisting of stainless steel, hastelloy, brass, aluminum, TEFLON, glass and ceramic. The inner container, outer container and rotating rod have a cross-section selected from the group consisting of triangular, rectangular, pentagonal, hexagonal, circular, oval, heart shape, trumpet shape and other geometrical shapes. The rotating rod can be assembled at a position between the inner container and the outer container.

The inner and outer materials can be liquid, thermoplastic polymers which have been completely polymerized and heated up to or above the melting points or the glass transition temperatures, liquid prepolymers or oligomers which have not completed polymerization reaction, monomers, or suspensions of ceramic particles. It is preferable that the differences in the density and viscosity are small between the two materials, also it is preferable that the viscosities are not very low. In case that the viscosity of the material is low, it is preferable to carry out polymerization to increase the viscosity up to a desired level by heating the apparatus or radiating ultraviolet thereon.

When the inner material in the inner space 5 and the outer material in the outer space 6 (i.e., the space between the inner container 2 and the outer container 1) come to a standstill, the inner container is slowly removed upward not to disturb the inner and outer materials. If the inner container is removed, the solid wall between the inner and outer materials does not exist any more. Consequently, the two materials can be mixed due to gravity thereof. However, if the difference in the density between the two materials is small and if the viscosities of the two materials are not very low, the interface between the two materials tend to remain unperturbed by gravity. After the inner container is removed, the rotating rod 3 is rotated by a motor (not shown). A motor is connected to the rotating rod, which can be easily carried out by one skilled in the art. When the rotating rod is slowly rotated, the inner and the outer materials are mixed in the circumferential direction of the rotating rod, but not disturbed in the radial direction or in the axial direction, because the viscous force is dominant. This mixing flow of the inner and the outer materials in the circumferential direction is known as "laminar flow" in fluid mechanics. Thus the mixing of the inner and the outer materials in the circumferential direction in the present invention may be called the "laminar mixing".

As the rotating rod rotates, the inner and the outer materials are mixed more and more uniformly in the circumferential direction, varying the mixing ratio of the inner material to the outer material so as to prepare an object with radially-varying properties from the center to the outer circumference. FIG. 5 is a cross-sectional view of the apparatus according to the present invention, showing the mixing ratio of inner material to outer material. At the radial position of $R_1$ (i.e., $r=R_1$) from the center, the mixing ratio of the inner material to the outer material is the ratio of lengths of the arcs, thus being $L_1$ to $L_2$. As shown in FIG. 5, at a smaller value of the radial position the length of the arc corresponding to the amount of the inner material is larger, thus the concentration of the inner material is higher than that of the outer material at that radial position. On the other hand, at a larger value of the radial position the corresponding arc length is smaller. Thus the concentration of the inner material is relatively lower at that radial position.

After completing laminar mixing of the inner and the outer materials, the rotating rod is slowly removed upward from the inner container without disturbing the mixed material. The means for removing the rotating rod upwardly from the inner container can be easily understood by one skilled in the art. The rotating rod can be removed while it is kept rotating or stopped rotating. Once the rotating rod is removed from the apparatus, an object is prepared, which has radially-varying properties from the center to the outer surface, but has a uniform property at each radial position.

The space occupied by the rotating rod is filled with the mixed material as it is removed. The total volume of the rotating rod is relatively small compared to the volume of the inner material or the outer material, therefore the error in the mixing ratio at the center is negligible.

Alternatively, in the present invention, the entire apparatus can be rotated during or after the laminar mixing. The apparatus may be called a "preform reactor". In the case that the density difference between the inner and the outer materials is significant, the laminar mixed layer can be disturbed due to the gravity effect. Such disturbance can be prevented by rotating the preform reactor. If the preform reactor is rotated, the centrifugal force imposed on the mixed material offsets the gravity force. The rotational speed of the preform reactor can be determined depending on the density difference between the inner and the outer materials, which can be easily understood by one skilled in the art. Preferably, the rotational speed is in the range of 50 to 2,000 rpm, more preferably 50 to 500 rpm.

The laminar-mixed material thus prepared in the outer container is in a liquid state, and should be changed into a solid state. If the mixed material is a polymer which has been heated up to or above the melting point or glass transition temperature, the material can be cooled slowly to a solid state. If the material is a prepolymer, polymerization should proceed by heating or radiating ultraviolet and the material should be then cooled slowly. If the material is a green form of ceramic suspensions, a solid state object can be obtained by firing in a furnace.

The property of an object prepared in accordance with the present invention can be an optical property, index of refraction, heat expansion coefficient, porosity, etc.

Control of Mixing Ratio in Radial Direction

In FIG. 5, the arc length $L_1$ corresponds to the amount of the inner material at the radial position, whereas $L_2$ corresponds to the amount of the outer material at the same radial position. $R_1$, and $\theta_1$ is the angle corresponding to the arc length $L_1$. Thus the ratio of the inner material to the outer material at $R_1$ is equivalent to the ratio of $L_1$ to $L_2$ or $\theta_1$ to $360-\theta_1$. At a radial position smaller than $R_1$, the arc length corresponding to the amount of the inner material is larger than $L_1$ or the angle is larger than $\theta_1$. Thus the relative concentration of the inner material to the outer material is larger. At a radial position larger than $R_1$, on the other hand, the arc length is larger than $L_1$ or the angle is larger than $\theta_1$, so that the relative concentration ratio of the inner material can be high. Therefore, in the case of FIG. 5 in which the cross-section of the inner container is a heart-like shape, a cylindrical object that has gradually decreasing concentration of the inner material in the radial direction can be prepared. If the index of refraction of the inner material is higher than that of the outer material, the cylindrical object can have the refractive index profile similar to the one shown in FIG. 1.

As shown in FIG. 6(a), if the cross-section of the inner container is a pie-like shape, the angle $\theta_1$ corresponding to the amount of the inner material is constant regardless of the radial position. Thus the mixing ratio of the two materials is the same over all radial positions. On the other hand, if the cross-section of the inner container is a trumpet-like shape as shown in FIG. 6(a), the angle $\theta_1$ corresponding to the amount of the inner material becomes increasingly larger as the radial position increases. Consequently, a cylindrical object that has a gradually increasing concentration of the inner material in the radial direction can be prepared.

If the cross-section of the inner container is a concentric circle with that of the outer container as shown in FIG. 7(a), the two materials are not mixed at all. In this case, the cylindrical object will become a cylindrical core with radius of a surrounded uniformly by the outer material of a thickness of t. On the other hand, if the inner circle is not positioned concentrically with the outer circle as shown in FIG. 7(b), the cylindrical object will consist of three layers where a pure inner material with a radius of a is surrounded by a mixture at a radial position from a to b, which is then surrounded by a pure outer material beyond the radial position b.

Thus, the mixing ratio of the inner material to the outer material can be controlled by varying the cross-section and/or the location of the inner container, which is one of the most important features of the present invention.

Cross-sectional Shape of the Outer Container

The cross-section of the outer container will be a circular shape in most applications. However, a rectangular or triangular shape can be applied whenever necessary as shown in FIGS. 8(a) and 8(b), or other various cross-sectional shapes can be also applied. In case that the cross-section of the outer container is a rectangular or triangular shape as shown in FIGS. 8(a) and 8(b), the physical properties of the objects are varied as shown schematically in FIGS. 9(a) and 9(b). In FIGS. 9(a) and 9(b), the contour lines are the loci of the equal mixing ratio of the two materials. While the contour lines are of circular shape near the center, they become closer to the shape of the outer container as the outer container wall is approached.

Preparation of Objects with Radially-Varying Properties

According to the present invention, an object with radially-varying properties and subsequently a graded-index plastic optical fiber can be prepared as follows. A monomer mixture of 65 weight % of methylmethacrylate (MMA) and 35 weight % benzylmethacrylate (BMA) is put into the inner container as shown in FIG. 2, and a monomer mixture of 80 weight % of methylmethacrylate (MMA) and 20 weight % benzylmethacrylate (BMA) is put into the outer container. The overall apparatus is heated up to 70° C. and kept at that temperature to copolymerize the monomers. Although not shown in FIG. 2, a stirrer or an agitator can be installed in the apparatus to proceed with polymerization of the monomers.

After polymerization proceeds to a point where the viscosity of the prepolymer is about 1000 to 2000 centipoises, the inner container is slowly removed upward. The rotating rod is then rotated so as to mix the two prepolymers in the circumferential direction. While the rotational speed of the rotating rod can be any value as long as the flow is not influenced by the inertia in radial direction, it preferably is in the range of about 5 to 30 rpm.

After completion of mixing the two materials by rotating the rod, the rod is lowly removed upward. At this stage, the material in the outer container is in a state where the mixing in the circumferential direction is uniform at every radial position, and the mixing ratio varies in the radial direction. In this case, the mixed material has a refractive index profile equivalent to 35 weight % concentration of BMA near the center and 20 weight % concentration of BMA near the wall of the outer container. Polymerization of the prepolymers is continued at 75° C. and is completed at 125° C. Unreacted residual monomers may be mixed by the molecular diffusion due to the difference in the concentration of the two prepolymers. However, the diffusion of the unreacted monomers can be neglected, because the viscosities of the prepolymers are relatively high and the difference of concentrations of the prepolymers is relatively small.

After completion of the polymerization, the MMA-BMA copolymer is cooled to or below the glass transition temperature and the outer container is removed to obtain a solid cylindrical object. As MMA and BMA have similar reactivity, the object thus obtained is an amorphous random copolymer, and the concentration of BMA varies from about 35% to 20% along the radial direction. The index of refraction of the object is 1.519 at the center where the concentration ratio of MMA/BMA is 65%/35%, and decreases to 1.507 at the outer surface of the object where the concentration ratio is 80%/20%.

In the case of FIG. 5 in which the cross-section of the inner container is a heart-like shape, the cylindrical object shows a refractive index profile of a parabolic shape as shown in FIG. 1.

The cylindrical objects prepared in accordance with the present invention can be transformed to a GI plastic optical fiber (GI-POF) by thermal drawing, or to a relatively thick strand to prepare a GI rod lens.

If the cross-section of the inner container is a trumpet-like shape as shown in FIG. 6(a) or if the inner material is exchanged with the outer material, the angle $\theta_1$ corresponding to the amount of the inner material becomes increasingly larger as the radius $R_1$ increases, thus a cylindrical object that has gradually increasing concentration of the inner material in the radial direction can be prepared. The index of refraction of such object increases from the center to the outer surface. These objects can be used to prepare a negative gradient optical lens for the correction of aberration.

Apparatus for Preparing Objects

The apparatus shown in FIG. 2 can be prepared from a small size to a large scale regardless of the diameter or the length of the outer container. However, if a polymerization reaction is to be induced, the maximum diameter of the outer container is preferably smaller than 15 cm to facilitate heat transfer. The maximum length of the outer container is preferably smaller than 150 cm if the conventional thermal drawing is to be applied afterward.

The rotating rod can have a diameter of about 5 mm to 5 cm, preferably about 5 mm to 1 cm. The rotating rod 3 is installed in the inner container 2 or between the inner container and the outer container 1. The profile of physical properties of an object can be also varied by the location of the rod. The rod can be rotated by an electric or physical means, which will be easily carried out by one skilled in the art.

A stirring means may be further added in the inner container or outer container to stir the contents, and a heating means may be also installed in the inner container or outer container to heat the contents.

Two or more inner containers can be installed in the outer container whose cross section may be identical or different.

The outer container, inner container and rotating rod can be made of stainless steel, hastelloy, brass, aluminum, TEFLON, glass or ceramic, which is easily understood by one skilled in the art.

Inner and Outer Materials

Monomers, homopolymers, copolymers or mixtures thereof can be used as the inner and the outer materials.

Examples of the monomers are methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2-diphenylethylmethacrylate, diphenylethylmethacrylate, furfurylmethacrylate, 1-phenylcyclohexylmethacrylate, pentachlorophenylmethacrylate, pentabromophenylmethacrylate, styrene, perfluoro-2,2-dimethyl-1,3-dioxole, tetrafluoroethylene, chlorotrifluoroethylene, vinylidene fluoride, hexafluoropropylene, trifluoroethylene, perfluoroallyl vinyl ether, and fluorovinyl ether.

Examples of the homopolymers are polymers polymerized from the monomers above.

Examples of the copolymers are copolymer of methylmethacrylate(MMA)-benzylmethacrylate(BMA), copolymer of styrene-acrylonitrile(SAN), copolymer of methylmethacrylate(MMA)-2,2,2-trifluoroethylmethacrylate(TFEMA), copolymer of methylmethacrylate(MMA)-2,2,3,3,3-pentafluoropropylmethacrylate(PFPMA), copolymer of methylmethacrylate(MMA)-1,1,1,3,3,3,-hexafluoroisomethacrylate(HFIPMA), copolymer of methylmethacrylate(MMA)-2,2,3,3,4,4,4-heptafluorobutylmethacrylate(HFBMA), copolymer of trifluoroethylmethacrylate(TFEMA)-pentafluoropropylmethacrylate(PFPMA), copolymer of trifluoroethylmethacrylate(TFEMA)-hexafluoroisomethacrylate(HFIPMA), and copolymer of trifluoroethylmethacrylate(TFEMA)-heptafluorobutylmethacrylate(HFBMA).

Further examples of the copolymers include copolymers polymerized with a first monomer of perfluoro-2,2-dimethyl-1,3-dioxole and a second monomer selected from the group consisting of tetrafluoroethylene, chlorotrifluoroethylene, vinylidene fluoride, hexafluoropropylene, trifluoroethylene, perfluoroallyl vinyl ether, and fluorovinyl ether.

Further examples of the copolymers include terpolymers polymerized with a first monomer of perfluoro-2,2-dimethyl-1,3-dioxole and a second monomer and a third monomer which are selected from the group consisting of tetrafluoroethylene, chlorotrifluoroethylene, vinylidene fluoride, hexa-fluoropropylene, trifluoroethylene, perfluoroallyl vinyl ether, and fluorovinyl ether.

Further examples of the copolymers include copolymers polymerized with a first monomer of perfluoroallyl vinyl ether and a second monomer selected from the group consisting of perfluoro-2,2-dimethyl-1,3-dioxole, tetrafluoroethylene, chlorotrifluoroethylene, vinylidene fluoride, hexa-fluoropropylene, trifluoroethylene, and fluorovinyl ether.

Further examples of the copolymers include terpolymers polymerized with a first monomer of perfluoroallyl vinyl ether and a second monomer and a third monomer which are selected from the group consisting of perfluoro-2,2-dimethyl-1,3-dioxole, tetrafluoroethylene, chlorotrifluoroethylene, vinylidene fluoride, hexa fluoropropylene, trifluoroethylene, and fluorovinyl ether.

A material with a higher index of refraction is put into the inner container as the inner material, and a material with a lower index of refraction is put into the space between the inner container and the outer container as the outer material.

The radially-varying properties of an object include all physico-chemical properties such as tensile strength, color, thermal expansion coefficient, catalytic activity, and porosity as well as the index of refraction of POF. An object in which these properties vary radially can be prepared by the present invention once proper materials are chosen.

In addition, a ceramic material can be applied in this invention. For example, if the concentration of ceramic particles is increased along the outward direction in a matrix, a state-of-the-art product with an excellent-heat resistance and abrasion resistance can be-obtained. As another example, if two ceramic suspensions are used as inner and outer materials, a product obtained with good hardness at the surface with minimal influence by the thermal stress resulting from the differences in the thermal expansion coefficient. The examples of the ceramic suspensions are alumina and zirconium. Such ceramic materials with radially-varying properties are known as Functionally Gradient Materials (FGMs).

EXAMPLE

Preparation of Objects with Radially-Varying Properties

According to the present invention, an object with radially-varying properties and subsequently a graded-index plastic optical fiber can be prepared as follow: A monomer mixture consisting of 64.65 weight % of methylmethacrylate (MMA), 34.65 weight % of benzylmethacrylate (BMA), 0.5 weight % of benzoyl peroxide (BPO) as initiator of polymerization, and 0.2 wight % of n-butane thiol as chain transfer agent were put into the inner container. A monomer mixture consisting of 79.65 weight % of methylmethacrylate (MMA), 19.65 weight % of benzylmethacrylate (BMA), 0.5 weight % of benzoyl peroxide (BPO) as initiator of polymerization, and 0.2 wight % of n-butane thiol as chain transfer agent were put into the outer container. The entire apparatus was heated up to 70° C. and kept at that temperature to copolymerize the monomer mixtures.

After polymerization proceeded to a point where the viscosity of the prepolymer is about 1500 centipoises, the inner container was slowly removed upward. The rotating rod was then rotated so as to mix the two prepolymers in the circumferential direction. The rotational speed of the rotating rod was 20 rpm.

After completion of mixing the two materials by rotating the rod, the rod was slowly removed upward. Then the material in the outer container was in a state where the mixing in the circumferential direction is uniform, and the mixing ratio varies in the radial direction. In this case, the mixed material has a profile equivalent to 35 weight % concentration of BMA near the center and 20 weight % concentration of BMA near the wall of the outer container. Polymerization of the prepolymers was continued at 75° C. and was completed at 125° C.

After completion of the polymerization, the MMA-BMA copolymer was cooled below the glass transition temperature and the outer container was removed to obtain a solid cylindrical object. As MMA and BMA have similar reactivity, the object thus obtained was an amorphous random copolymer, and the concentration of BMA varied from about 35% to 20% along the radial direction. The index of refraction of MMA-BMA copolymer was 1.519 at the center where the concentration ratio of MMA BMA was 65%/35%, and decreased to 1.507 at the outer surface of the object where the concentration ratio of MMA/BMA was 80%/20%.

The cylindrical objects prepared in accordance with the present invention were transformed to a GI plastic optical fiber (GI-POF) by thermal drawing, and to a relatively thick strand to prepare a GI rod lens.

It should be apparent to those ordinarily skilled in the art that various changes and modifications can be added without departing from the scope of the present invention.

What is claimed is:

1. A method of preparing an object with a radially-varying property, which comprises the steps of:
   providing a preform reactor comprising an outer container having a bottom, an inner container installed in said outer container, said inner container having a bottom, a rotating rod installed at a position in said outer container, and a sealing member for sealing said outer and inner containers at said bottoms thereof;
   filling said inner container with an inner material and a space between said inner container and said outer container with an outer material wherein said outer material has a different property from said inner material;
   removing said inner container; and
   rotating said rotating rod for laminar mixing of said inner and outer materials.

2. The method according to claim 1 further comprising the step of rotating said preform reactor during or after said laminar mixing by said rotating rod.

3. The method according to claim 2 wherein said preform reactor rotates with a rotational speed in the range of 50 to 2,000 rpm.

4. The method according to claim 1 wherein said inner container, said outer container and said rotating rod have a cross-section selected from the group consisting of triangular, rectangular, pentagonal, hexagonal, circular, oval, heart shape and, trumpet shape.

5. The method according to claim 1 wherein said rotating body is installed at a position between said inner container and said outer container.

6. The method according to claim 1 wherein said inner material and said outer material are selected from the group consisting a monomer, a homopolymer, a copolymer, and a mixture thereof.

7. The method according to claim 6 wherein said monomer is selected from the group consisting of methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2-diphenylethylmethacrylate, diphenylethylmethacrylate, furfurylmethacrylate, 1-phenylcyclohexylmethacrylate, pentachlorophenylmethacrylate, pentabromophenylmethacrylate, styrene, perfluoro-2,2-dimethyl-1,3-dioxole, tetrafluoroethylene, chlorotrifluoroethylene, vinylidene fluoride, hexafluoropropylene, trifluoroethylene, perfluoroallyl vinyl ether, and fluorovinyl ether.

8. The method according to claim 6 wherein said homopolymer is a polymer which is polymerized from a monomer selected from the group consisting of methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2-diphenylethylmethacrylate, diphenylethylmethacrylate, furfurylmethacrylate, 1-phenylcyclohexylmethacrylate, pentachlorophenylmethacrylate, pentabromophenylmethacrylate, styrene, perfluoro-2,2-dimethyl-1,3-dioxole, tetrafluoroethylene, chlorotrifluoroethylene, vinylidene fluoride, hexafluoropropylene, trifluoroethylene, perfluoroallyl vinyl ether, and fluorovinyl ether.

9. The method according to claim 6 wherein said copolymer is selected from the group consisting of copolymer of methylmethacrylate(MMA)-benzylmethacrylate(BMA)], copolymer of stylene-acrylonitrile(SAN), copolymer of methylmethacrylate(MMA)-2,2,2-trifluoroethylmethacrylate(TFEMA), copolymer of methylmethacrylate(MMA)-2,2,3,3,3-pentafluoropropylmethacrylate(PFPMA), copolymer of methylmethacrylate(MMA)-1,1,1,3,3,3,-hexafluoroisomethacrylate(HFIPMA), copolymer of methylmethacrylate(MMA)-2,2,3,3,4,4,4-heptafluorobutylmethacrylate(HFBMA), copolymer of trifluoroethylmethacrylate(TFEMA)-pentafluoropropylmethacrylate(PFPMA), copolymer of trifluoroethylmethacrylate(TFEMA)-hexafluoroisomethacrylate(HFIPMA), and copolymer of trifluoroethylmethacrylate(TFEMA)-heptafluorobutylmethacrylate(HFBMA).

10. The method according to claim 6 wherein said copolymer is selected from the group consisting of copolymers polymerized with a first monomer of perfluoro-2,2-dimethyl-1,3-dioxole and a second monomer selected from the group consisting of tetrafluoroethylene, chlorotrifluoroethylene, vinylidene fluoride, hexafluoropropylene, trifluoroethylene, perfluoroallyl vinyl ether, and fluorovinyl ether.

11. The method according to claim 6 wherein said copolymer is selected from the group consisting of terpolymers polymerized with a first monomer of perfluoro-2,2-dimethyl-1,3-dioxole and a second monomer and a third monomer which are selected from the group consisting of tetrafluoroethylene, chlorotrifluoroethylene, vinylidene fluoride, hexafluoropropylene, trifluoroethylene, perfluoroallyl vinyl ether, and fluorovinyl ether.

12. The method according to claim 6 wherein said copolymer is selected from the group consisting of copolymers polymerized with a first monomer of perfluoroallyl vinyl ether and a second monomer selected from the group consisting of perfluoro-2,2-dimethyl-1,3-dioxole, tetrafluoroethylene, chlorotrifluoroethylene, vinylidene fluoride, hexafluoropropylene, trifluoroethylene, and fluorovinyl ether.

13. The method according to claim 6 wherein said copolymer is selected from the group consisting of terpolymers polymerized with a first monomer of perfluoroallyl vinyl ether and a second monomer and a third monomer which are selected from the group consisting perfluoro-2,2-dimethyl-1,3-dioxole, tetrafluoroethylene, chlorotrifluoroethylene, vinylidene fluoride, hexafluoropropylene, trifluoroethylene, and fluorovinyl ether.

14. The method according to claim 6 wherein said inner material and outer material are a liquid metal or a ceramic suspension.

15. The method according to claim 1 wherein said property is an optical property.

16. The method according to claim 1 wherein said property is the index of refraction.

17. The method according to claim 1 wherein said property is the thermal expansion coefficient.

18. The method according to claim 1 wherein said property is porosity.

19. The method according to claim 1 wherein said property is the index of refraction and wherein said inner material has a higher index of refraction than said outer material.

20. The method according to claim 1 further comprising removing said rotating rod after said laminar mixing.

21. The method according to claim 1 wherein said rotating rod is installed in said inner container.

\* \* \* \* \*